(12) United States Patent
Nakano et al.

(10) Patent No.: US 10,646,923 B2
(45) Date of Patent: May 12, 2020

(54) LAYERED MOLDING DEVICE

(71) Applicant: Kabushiki Kaisha Toshiba, Minato-ku (JP)

(72) Inventors: Hideshi Nakano, Yokosuka (JP); Hiroshi Ohno, Yokohama (JP); Aya Watase, Kawasaki (JP); Morihiro Machida, Chuo (JP); Kazunari Iwakawa, Yokohama (JP); Shanying Pan, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 222 days.

(21) Appl. No.: 15/756,315

(22) PCT Filed: Mar. 24, 2016

(86) PCT No.: PCT/JP2016/059521
§ 371 (c)(1),
(2) Date: Feb. 28, 2018

(87) PCT Pub. No.: WO2017/047139
PCT Pub. Date: Mar. 23, 2017

(65) Prior Publication Data
US 2018/0243827 A1 Aug. 30, 2018

(30) Foreign Application Priority Data
Sep. 14, 2015 (JP) .................................. 2015-181252

(51) Int. Cl.
*B22F 3/105* (2006.01)
*B29C 64/165* (2017.01)
(Continued)

(52) U.S. Cl.
CPC ............ *B22F 3/105* (2013.01); *B22F 3/1055* (2013.01); *B22F 3/16* (2013.01); *B23K 26/34* (2013.01);
(Continued)

(58) Field of Classification Search
None
See application file for complete search history.

(56) References Cited

U.S. PATENT DOCUMENTS

| 2006/0192322 A1 | 8/2006 | Abe et al. |
| 2012/0139166 A1 | 6/2012 | Abe et al. |
| 2014/0175708 A1 | 6/2014 | Echigo et al. |

FOREIGN PATENT DOCUMENTS

| JP | 2002-038201 A | 2/2002 |
| JP | 2008-255488 A | 10/2006 |
| JP | 2014-125643 A | 7/2014 |

OTHER PUBLICATIONS

International Search Report dated May 24, 2016 in PCT/JP2016/059521, filed on Mar. 24, 2016.

*Primary Examiner* — Mary Lynn F Theisen
(74) *Attorney, Agent, or Firm* — Oblon, McClelland, Maier & Neustadt, L.L.P.

(57) ABSTRACT

An additive manufacturing apparatus includes an operation unit, a first face, a mover, a supplier, and an irradiator. The operation unit includes a first part and a second part that cover a part of a supply region supplied with a powdery material and facing a first direction are aligned in a second direction, and includes a first opening extending between the first part and the second part in the first direction. The first face of the first part faces the second part, and is provided with a second opening. The mover moves the operation unit. The supply unit supplies an inert gas from the second opening to the first opening. The irradiator is spaced apart from the operation unit, and can emit an energy ray to the (Continued)

supply region through the first opening, and change a position with which the energy ray is irradiated.

11 Claims, 10 Drawing Sheets

(51) Int. Cl.
*B29C 64/214* (2017.01)
*B29C 64/205* (2017.01)
*B29C 64/153* (2017.01)
*B29C 67/00* (2017.01)
*B22F 3/16* (2006.01)
*B23K 26/34* (2014.01)
*B23K 35/02* (2006.01)
*B33Y 30/00* (2015.01)
*B33Y 10/00* (2015.01)

(52) U.S. Cl.
CPC ........ *B23K 35/0244* (2013.01); *B29C 64/153* (2017.08); *B29C 64/165* (2017.08); *B29C 64/205* (2017.08); *B29C 64/214* (2017.08); *B29C 67/00* (2013.01); *B22F 2003/1056* (2013.01); *B22F 2003/1059* (2013.01); *B33Y 10/00* (2014.12); *B33Y 30/00* (2014.12)

LAYERED MOLDING DEVICE

CROSS-REFERENCE TO RELATED APPLICATIONS

This application is a national stage application of International Application No. PCT/JP2016/059521, filed on Mar. 25, 2016, which designates the United States incorporated herein by reference, and which is based upon and claims the benefit of priority from Japanese Patent Application No. 2015-181252, filed on Sep. 14, 2015, the entire contents of each of which are incorporated herein by reference.

FIELD

Embodiments described herein relate generally to an additive manufacturing apparatus.

BACKGROUND

Additive manufacturing apparatuses such as three-dimensional printers that form three-dimensional shapes from powdered materials are known. Such an additive manufacturing apparatus additively forms layers of the materials and solidify each layer of the materials with, for example, laser beams.

DETAILED DESCRIPTION

According to an embodiment, an additive manufacturing apparatus includes an operation unit, a first face, a mover, a supplier and an irradiator. The operation unit includes a first part and a second part and is provided with a first opening between the first part and the second part, the first part and the second part that cover a part of a supply region facing a first direction and supplied with a powdery material, and that are aligned in a second direction intersecting with the first direction, the first opening extending in the first direction. The first face of the first part faces the second part, and is provided with a second opening. The mover moves the operation unit with respect to the supply region. The supplier supplies an inert gas from the second opening to the first opening. The irradiator is spaced apart from the operation unit, and is capable of emitting an energy ray to the material in the supply region through the first opening, and changing a position with which the energy ray is irradiated.

Hereinafter, a first embodiment will be described with reference to FIGS. 1 to 8. In the present specification, basically, a vertical upward direction is defined as an upward direction, and a vertical downward direction is defined as a downward direction. Constituent elements according to embodiments may be represented differently and explained differently. The constituent elements may be given other expressions or explanations not described herein. Constituent elements not differently represented and explained may be expressed differently.

Figure 1:
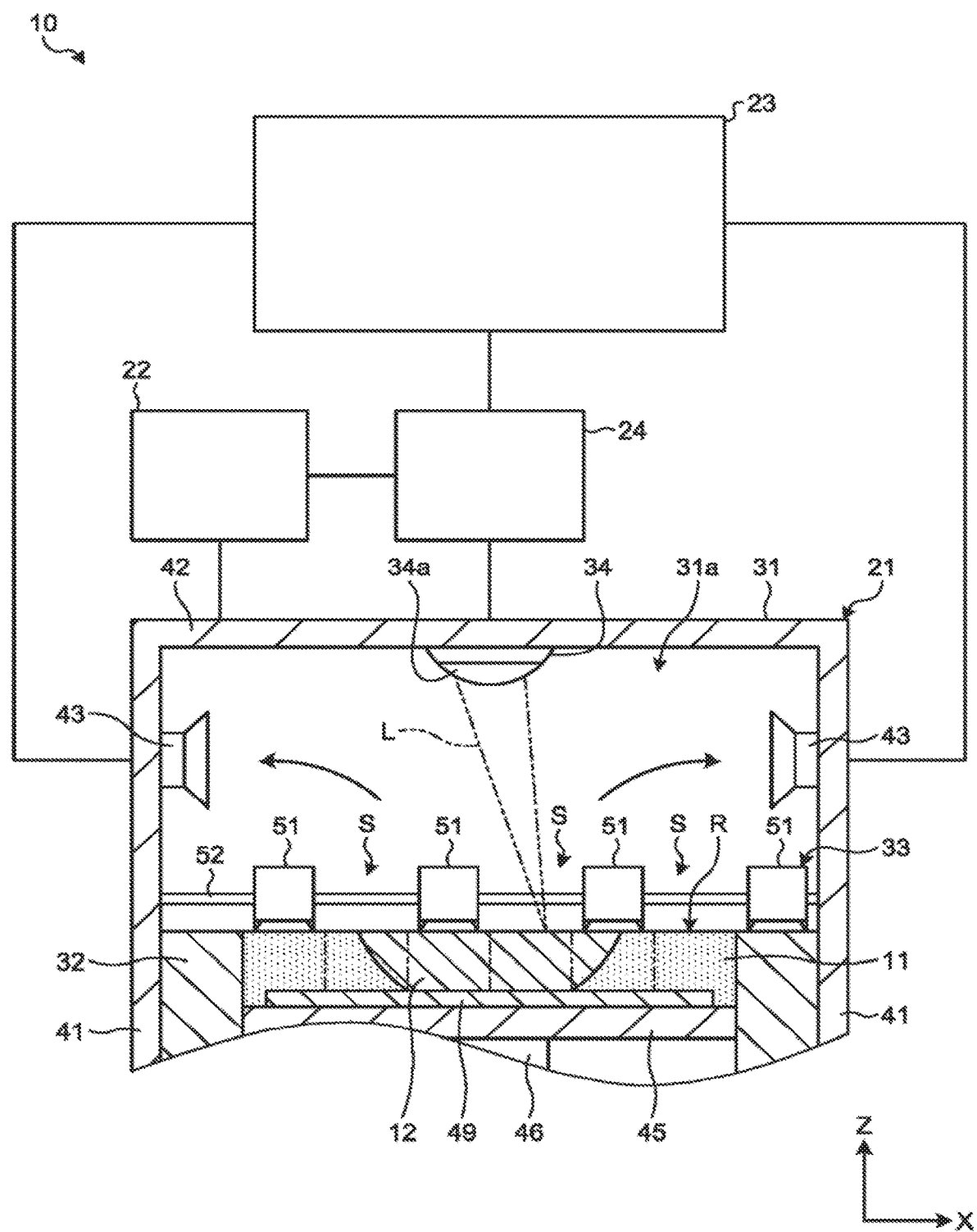
FIG. 1 is a schematic cross-sectional view of a three-dimensional printer according to a first embodiment.

FIG. 1 is a schematic cross-sectional view of a three-dimensional printer 10 according to a first embodiment. The three-dimensional printer 10 is an example of an additive manufacturing apparatus. The three-dimensional printer 10 is an apparatus which additively manufactures a three-dimensional object 12 from a powdery material 11. Additive manufacturing can also be referred to as additive manufacturing (AM).

As illustrated in the drawings, in the present specification, X-axis, Y-axis and Z-axis are defined. The X-axis, the Y-axis, and the Z-axis are orthogonal to each other. The X-axis extends along the width of the three-dimensional printer 10. The Y-axis extends along the depth (length) of the three-dimensional printer 10. The Z-axis extends along the height of the three-dimensional printer 10. In the present embodiment, layers of the material 11 are added along the Z-axis, and the surface of the layers of the material 11 is formed along the X-axis and the Y-axis.

The material 11 is a material of the object 12, and is, for example, a metal powder such as iron. The material 11 is not limited thereto, and may be resin powder or other materials. The three-dimensional printer 10 may build the object 12 from different types of materials 11.

As illustrated in FIG. 1, the three-dimensional printer 10 includes a manufacturing unit 21, a gas supply unit 22, a fume collection unit 23, and a control unit 24. The manufacturing unit 21 may also be referred to as a processing unit and a processing area, for example. The gas supply unit 22 is an example of a supplier that supplies gas. The fume collection unit 23 is an example of a suction unit, and, for example, may be referred to as a collector or a remover.

In the manufacturing unit 21, the object 12 is manufactured from the material 11. In the present embodiment, the manufacturing unit 21 includes a treatment tank 31, a manufacturing tank 32, a layering device 33, and an optical device 34. The layering device 33 is an example of an operation unit.

The treatment tank 31 has, for example, a sealable box shape. A treatment chamber 31a is provided inside the treatment tank 31. The treatment chamber 31a may also be referred to as, for example, a processing chamber, a chamber, and an area. The treatment chamber 31a accommodates the manufacturing tank 32, the layer device 33, and the optical device 34.

The treatment tank 31 has sidewalls 41, a top wall 42, and inlets 43. The sidewalls 41 are disposed in, for example, a quadrangular tubular form extending in the Z-axis direction. The top wall 42 connects the top ends of the sidewalls 41. The sidewalls 41 and the top wall 42 form the treatment chamber 31a inside.

The sidewalls 41 are, for example, provided with the inlets 43 that open to the treatment chamber 31a. The inlets 43 may be provided in other locations. The inlets 43 are connected to the fume collection unit 23. The number of the inlets 43 may not be plural. The fume collection unit 23 suctions the gas from the treatment chamber 31a through the inlets 43. Although FIG. 1 schematically illustrates the flow of the gas in the treatment chamber 31a by arrows, the flow of the gas is not limited thereto. The treatment chamber 31a is filled with, for example, air. In this case, air may be supplied to the treatment chamber 31a by the gas supply unit 22, or the treatment chamber 31a may be provided with a vent from which air is supplied. The treatment chamber 31a may be filled with an inert gas such as nitrogen. In this case, an inert gas may be supplied from the gas supply unit 22.

In the manufacturing tank 32, layers of the material 11 are formed to manufacture a three-dimensional object 12. Through repeated layering and solidifying the material 11, the object 12 is manufactured inside the manufacturing tank 32. The manufacturing tank 32 includes a stage 45 and an elevating device 46.

A base plate 49 is placed and fixed on the stage 45, and the material 11 is deposited thereon. The object 12 is built on the base plate 49. The object 12 may be directly built on the stage 45 without the base plate 49.

The material 11 deposited on the stage 45 forms a manufacturing region R. The manufacturing region R is an example of a supply region. The manufacturing region R is formed of the material 11 and is substantially a plane facing a Z-axis direction. The Z-axis direction is an example of a first direction. In other words, the manufacturing region R is the surface of the layered material 11 and is a plane along the X-axis and the Y-axis. The material 11 forming the manufacturing region R includes a solidified material 11 which forms a part of the object 12.

The elevating device 46 is, for example, a hydraulic elevator. The elevating device 46 is capable of vertically moving the stage 45. As the stage 45 moves, the material 11, the object 12, and the base plate 49 on the stage 45 move vertically.

The layering device 33 includes multiple squeegees 51 and a rail 52. The squeegees 51 are an example of a first part and a second part, and may also be referred to as, for example, a material supplier or a structure.

Each of the squeegees 51 forms a layer of the material 11 in the manufacturing tank 32 by supplying the material 11 to the manufacturing tank 32. In other words, the squeegees 51 add layer-upon-layer of the material 11 in the manufacturing tank 32.

Figure 2:
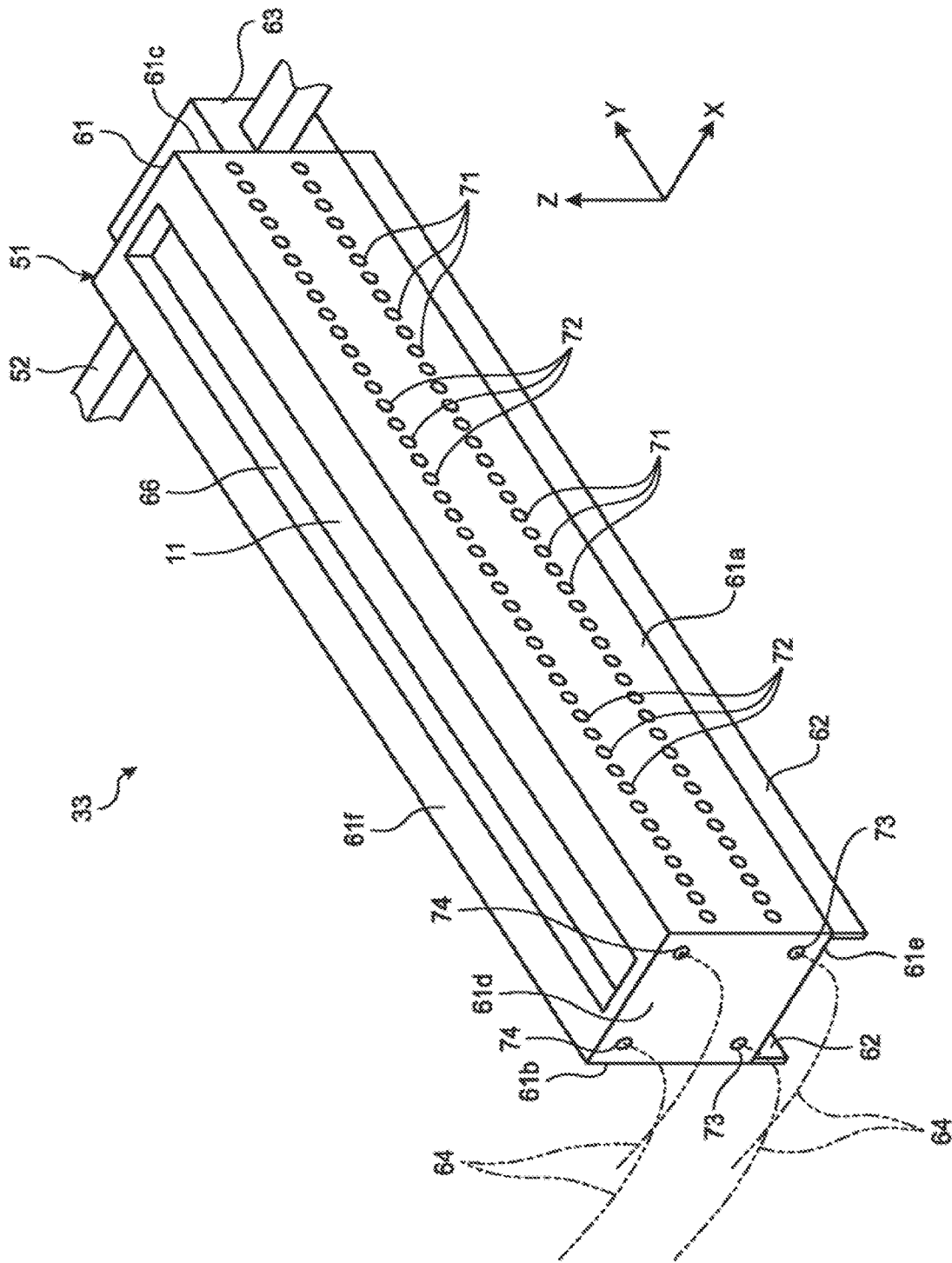
FIG. 2 is a perspective view of a part of the layering device of the first embodiment.

FIG. 2 is a perspective view of a part of the layering device 33 of the first embodiment. As illustrated in FIG. 2, each of the squeegees 51 includes a squeegee bar 61, two blades 62, a mover 63, and hoses 64.

The squeegee bar 61 has a substantially rectangular parallelepiped shape extending in the Y-axis direction. The Y-axis direction is an example of a third direction. The squeegee bar 61 may have other shapes. The squeegee bars 61 of the squeegees 51 extend in parallel.

Figure 3:
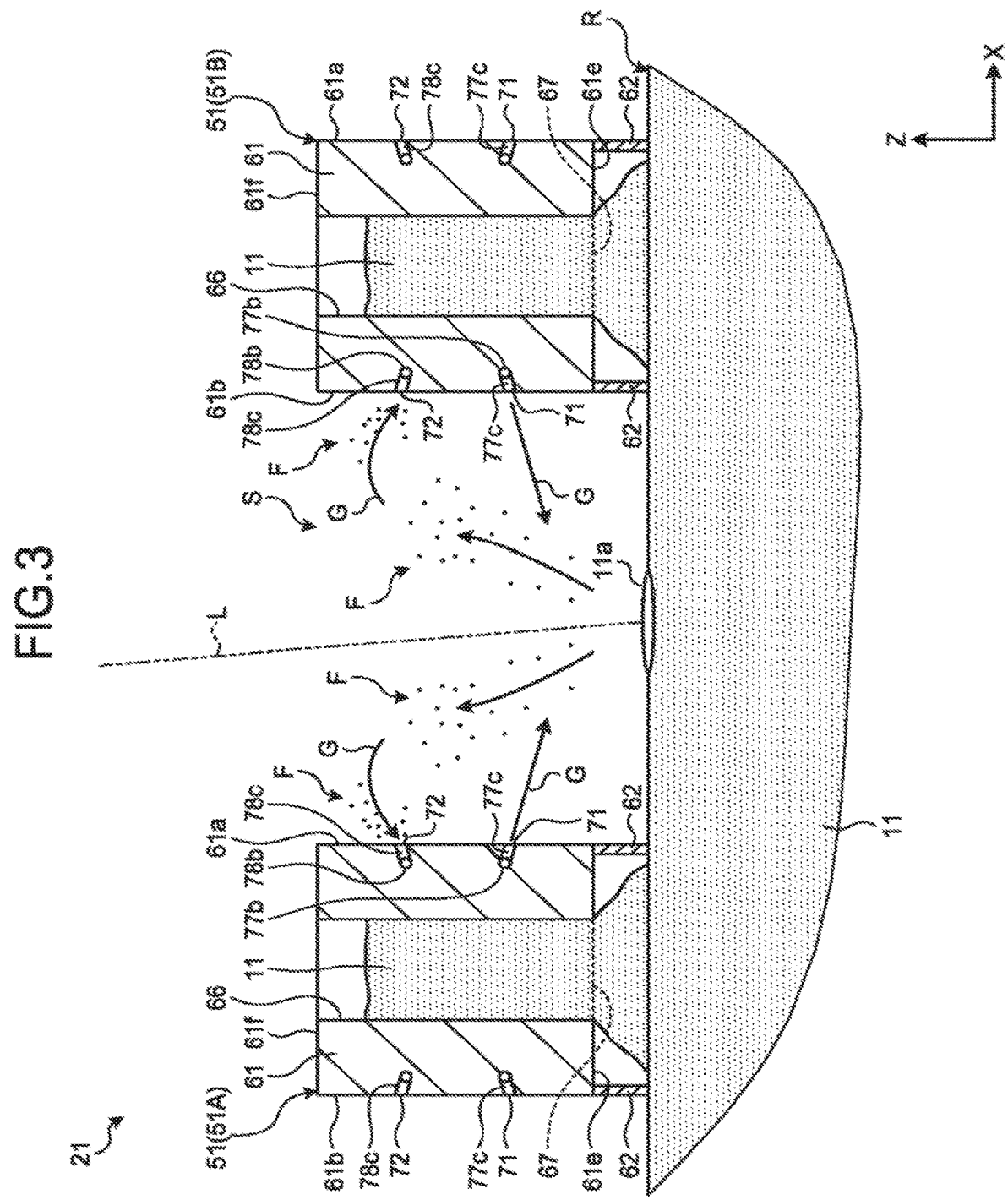
FIG. 3 is a cross-sectional view of a part of the three-dimensional printer of the first embodiment.

FIG. 3 is a cross-sectional view of a part of the three-dimensional printer 10 of the first embodiment. As illustrated in FIGS. 2 and 3, the squeegee bar 61 has a first side face 61a, a second side face 61b, a first end face 61c, a second end face 61d, a bottom face 61e, and a top face 61f. The first side face 61a is an example of the first face. The second side face 61b is an example of the second face.

The first side face 61a is substantially flat facing the X-axis direction. The second side face 61b is substantially flat facing the X-axis direction and is opposite the first side face 61a. The first and second side faces 61a and 61b may have irregularities and/or be curved faces.

The first end face 61c is substantially flat facing the Y-axis direction. The second end face 61d is substantially flat facing the Y-axis direction and is opposite the first end face 61c. The first and second end faces 61c and 61d may have irregularities and/or be curved faces.

The bottom face 61e is substantially flat facing downward along the Z-axis. When the squeegee bar 61 is located above the manufacturing region R, the bottom face 61e opposes the manufacturing region R. The bottom face 61e of the squeegee bar 61 is spaced apart from the manufacturing region R in the Z-axis direction. The top face 61f is opposite the bottom face 61e and substantially flat facing upward along the Z-axis. The top face 61f opposes the top wall 42, for example. The bottom face 61e and the top face 61f may have irregularities and/or be curved faces.

The squeegees 52 are aligned in the X-axis direction with gaps S. The X-axis direction is an example of a second direction. In other words, the adjacent squeegees 51 are spaced apart with gaps 3. The gaps 3 are an example of a first opening.

As illustrated in FIG. 3, the two adjacent squeegees 51 may be individually referred to as a squeegee 51A and a squeegee 51B. The squeegee 51A is an example of a first part, and the squeegee 51B is an example of a second part. The squeegee 51A and the squeegee 51B are aligned in the X-axis direction. Further, the squeegee 51A and the squeegee 51B are disposed with a gap S.

The squeegees 51 can be considered to include two or more squeegees 51A and two or more squeegees 51B. In this case, the squeegees 51A and the squeegees 51B may be alternatively arranged in the X-axis direction. Thus, the layering device 33 is provided with gaps S.

The gap S between every two squeegees 51 (51A, 51B) extends in the Y-axis direction. In the present embodiment, the gap S may also be referred to as slits. The gap S also extends in the Z-axis direction. Thus, the gap S opens to the top face 61f of each of the squeegees 51A and 51B, to expose a part of the manufacturing region R therefrom when viewed from, for example, the top wall 42.

The first side face 61a of the squeegee 51A faces the second side face 61b of the squeegee 51B. The first side face 61a of the squeegee 51A is an example of a first face. The second side face 61b of the squeegee 51B faces the first side face 61a of the squeegee 51A. The second side face 61b of the squeegee 51B is an example of a second face. That is, the first side face 61a of the squeegee 51 opposes the second side face 61b of another squeegee 51 with a gap S therebetween. In other words, the first side face 61a and the second side face 61b face the gap S.

Each squeegee bar 61 is provided with a material storage port 66 and a material supply port 67. The material storage port 66 is an example of a storage. The material supply port 67 is an example of a material supplier. As illustrated in FIG. 3, the material storage port 66 extends in the Z-axis direction and opens to the bottom face 61e and the top face 61f. In the present embodiment, the material supply port 67 is an opening in the bottom face 61e of the material storage port 66.

The material storage port 66 stores the powdery material 11. The material 11 is supplied into the material storage port 66 from, for example, an opening in the top face 61f. The stored material 11 is supplied to the manufacturing region R from the material supply port 67, for example, by gravity. In other words, the material 11 falls from the material storage port 66 into the manufacturing region R through the material supply port 67.

As illustrated in FIG. 2, the material storage port 66 extends in the Y-axis direction. In other words, the material storage port 66 extends in an extending direction of the squeegee bar 61. In the Y-axis direction, the length of the material storage port 66 is, for example, approximately equal to the length of the manufacturing region R. The length of the material storage port 66 is not limited thereto.

Each squeegee bar 61 is provided with multiple supply ports 71, multiple collection ports 72, two first connection ports 73, and two second connection ports 74. The supply ports 71 are an example of a second opening, a fourth opening, and outlets. The collection port 72 is an example of a third opening.

The first side face 61a and the second side face 61b are both provided with the supply ports 71. The supply ports 71 are aligned in the first and second side faces 61a and 61b in the Y-axis direction. The supply ports 71 are disposed at equal intervals.

The first side face 61a and the second side face 61b are both provided with the collection ports 72. The collection ports 72 are aligned in the first and second side faces 61a and 61b in the Y-axis direction. The collection ports 72 are arranged at equal intervals.

The collection ports 72 are located above the supply ports 71 in the Z-axis direction. In other words, the collection ports 72 are farther away from the manufacturing region R than the supply ports 71 are in the Z-axis direction.

The second end face 61d is provided with the two first connection ports 73 and the two second connection ports 74. The first connection ports 73 and the second connection ports 74 may be provided in other locations.

The first connection ports 73 are directly or indirectly connected to the gas supply unit 22 via the hoses 64. The second connection ports 74 are directly or indirectly connected to the fume collection unit 23 via the hoses 64. The hoses 64 have flexibility. Because of this, even when the squeegee 51 moves, the hoses 64 maintain the connection between the first connection ports 73 and the gas supply unit 22, and maintains the connection between the second connection ports 74 and the fume collection unit 23.

Figure 4:
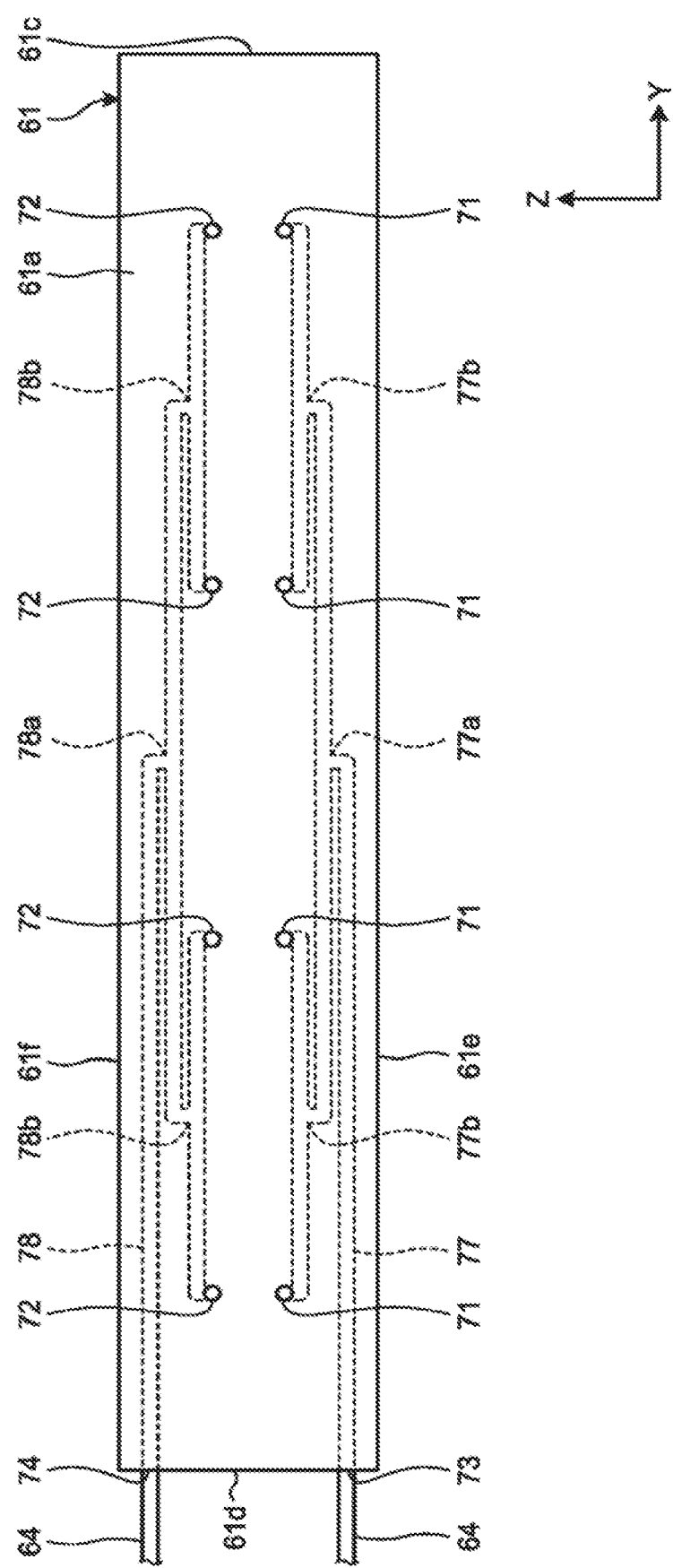
FIG. 4 is a schematic side view of a squeegee bar of the first embodiment.

FIG. 4 is a schematic side view of the squeegee bar 61 of the first embodiment. In FIG. 4, for the sake of explanation, the number of supply ports 71 and the number of collection ports 72 are smaller than those in FIG. 2.

As illustrated in FIG. 4, the squeegee bar 61 is provided with two supply passages 77 and two collection passages 78. FIG. 4 illustrates one of the supply passages 77 and one of the collection passages 78. The supply passages 77 are an example of a branch passage.

In the squeegee bar 61, one of the supply passages 77 and one of the collection passages 78 are provided between the material storage port 66 and the first side face 61a in the X-axis direction, for example. The other supply passage 77 and the other collection passage 78 are provided between the material storage port 66 and the second side face 61b in the X-axis direction.

The supply passages 77 are so-called fractal passages that connect the first connection ports 73 and the supply ports 71. That is, the supply passages 77 connect the gas supply unit 22 and the supply ports 71.

The supply passages 77 include different routes from the gas supply unit 22 to the supply ports 71. In the present embodiment, the supply passages 77 each have a furcation 77a and furcations 77b that divide the routes.

Each of the furcations 77a and 77b divides each route of the supply passage 77 into two. Each of the furcations 77a and 77b may divide each route of the supply passage 77 into three or more. Each of the furcations 77a and 77b has a substantially T-shape of two parts, one extending in the Z-axis direction and the other extending from the end of the part oppositely in the Y-axis direction. The furcations 77a and 77b may have other shapes.

In the supply passage 77, the route from the gas supply unit 22 to the supply ports 71 is first divided into two at the furcation 77a. The divided routes are further divided into two at the furcations 77b. That is, the furcation 77a is the first-stage division in the route of the supply passage 77. The two furcations 77b are the second-stage division in the route of the supply passage 77.

As described above, each of the routes of the supply passage 77 includes the furcations 77a and 77b in two stages. That is, the numbers of the furcations 77a and 77b in the routes of the supply passage 77 are the same. Each of the routes of the supply passage 77 may include the furcations in two or more stages.

The shapes of the two furcations 77b are substantially the same. The lengths of the parts of the two furcations 77b extending in the Z-axis direction are substantially the same. The lengths of the parts of the two furcations 77b extending in the Y-axis direction are substantially the same. That is, the lengths of the furcations 77b in the same stage are substantially the same.

In the routes of the supply passage 77, the lengths from the first connection ports 73 to the supply ports 71 are substantially the same. That is, the lengths of the routes of the supply passage 77 are substantially the same. The length of each route of the supply passage 77 corresponds to, for example, the length from the first connection ports 73 to each supply port 71, passing the center of the cross section of the supply passage 77.

As illustrated in FIG. 3, the supply passage 77 includes discharge passages 77c that connect the furcations 77b and the supply ports 71. The discharge passages 77c extend obliquely downward from the furcations 77b toward the supply ports 71. In other words, the supply ports 71 connected to the discharge passages 77c are directed further toward the manufacturing region R than toward the X-axis direction.

As illustrated in FIG. 4, the collection passage 78 is a so-called fractal passage that connects the second connection port 74 and the collection ports 72. That is, the collection passage 78 connects the fume collection unit 23 and the collection ports 72.

The collection passage 78 includes routes from the fume collection unit 23 to the collection ports 72. In the present embodiment, the collection passage 78 includes a furcation 78a and furcations 78b which divide the routes.

Each of the furcations 78a and 78b divides each route of the collection passage 78 into two. The furcations 78a and 78b may divide each route of the collection passage 78 into three or more. Each of the furcations 78a and 78b has a substantially T-shape of two parts, one extending in the Z-axis direction and the other extending from the end of the part oppositely in the Y-axis direction. The furcations 78a and 78b may have other shapes.

In the collection passage 78 each route from the fume collection unit 23 to the collection ports 72 is first divided into two at the furcation 78a. The divided routes are further divided into two at the furcations 78b. That is, the furcation 78a is the first-stage division in the route of the collection passage 78. The two furcations 78b are the second-stage division in the route of the collection passage 78.

As described above, the collection passage 78 includes the furcations 78a and 78b in two stages in each of the routes. That is, the numbers of the furcations 78a and 78b in the routes of the collection passage 78 are the same. The collection passage 78 may be provided with the furcations in two or more stages in each of the routes.

The two furcations 78b have substantially the same shape. The lengths of the parts of the two furcations 78b extending in the Z-axis direction are substantially the same. Further, the lengths of the parts of the two furcations 78b extending in the Y-axis direction are substantially the same. That is, the lengths of the furcations 78b in the same stage are substantially the same.

In the routes of the collection passage 78, the lengths from the second connection port 74 to the collection ports 72 are substantially the same. That is, the lengths of the routes of the collection passage 78 are substantially the same. The length of each route of the collection passage 78 corresponds to, for example, the length from the second connection port 74 to each collection port 72, passing the center of the cross section of the collection passage 78.

As illustrated in FIG. 3, the collection passage 78 includes suction passage 78c that connect the furcations 78b and the collection ports 72. The suction passages 78c extend obliquely upward from the furcations 78b toward the collection ports 72. In other words, the collection ports 72 connected to the suction passages 78c are directed further away from the manufacturing region R rather than in the X-axis direction.

The two blades 62 are substantially rectangular plate-like extending in the Y-axis direction. The two blades 62 are attached to the bottom face 61e of the squeegee bar 61, extending toward the manufacturing region R in the Z-axis direction. The two blades 62 may extend in other directions. In the Z-axis direction, the lower ends of the two blades 62 are substantially at the same position.

One of the blades 62 extends continuously from the first side face 61a of the squeegee bar 61. The other blade 62 extends continuously from the second side face 61b. In other words, the two blades 62 are spaced apart from each other in the X-axis direction. The material supply port 67 is located between the two blades 62.

As illustrated in FIG. 2, the mover 63 is attached to the first end face 61c of each squeegee bar 61. The mover 63 is movably attached to the rail 52 in an extending direction of the rail 52.

The rail 52 extends in the X-axis direction. Thus, the movers 63 of the squeegees 51 move the corresponding squeegees 51 in the X-axis direction. In other words, the movers 63 move the squeegees 51 with respect to the manufacturing region R.

The movers 63 each include, for example, a motor and a roller attached to a drive shaft of the motor. The outer periphery of the roller is brought into contact with the rail 52. The motor rotates the roller contacting the rail 52, to move the corresponding squeegee 51 along the rail 52. The movers 63 are not limited thereto, and the squeegees 51 may be moved by various means such as a gear or a magnet. Further, one mover 63 may move multiple squeegees 51 together.

At least one of the squeegees 51 is located above the manufacturing region R. In other words, the squeegees 51 cover a part of the manufacturing region R. The squeegees 51 are arranged with the gaps S through which the manufacturing region R is exposed. The squeegees 51 may be withdrawn from above the manufacturing region R, for example, by the movers 63.

The optical device 34 illustrated in FIG. 1 includes an optical system which includes a light source (not illustrated) having an oscillation element to emit a laser beam L, a scanner (not illustrated) such as a galvanometer mirror for scanning the laser beam L, a condenser lens (f-θ lens) (not illustrated) for focusing the laser beam (beam) L scanned by the scanner onto an image plane.

The optical device 34 further includes an irradiator 34a. The irradiator 34a is the part where the condenser lens is covered with a protective glass. The irradiator 34a is located above the manufacturing tank 32. For example, the irradiator 34a is fixed to the top wall 42. In other words, the irradiator 34a is provided independently from the manufacturing tank 32 and the layering device 33, and spaced apart from the manufacturing tank 32 and the layering device 33. The irradiator 34a may be provided at another location.

The optical device 34 emits the laser beam L from the light source and converts it into a parallel beam with a conversion lens. The laser beam L is an example of an energy ray. The optical device 34 emits the laser beam L to a desired position from the irradiator 34a, by reflecting the laser beam L by the galvanometer mirror whose tilt angle is changeable and by converging the laser beam L with the condenser lens. That is, the irradiator 34a can change the location to irradiate with the laser beam L.

The gas supply unit 22 includes, for example, a tank for storing the nitrogen gas G, and a pump for pumping the nitrogen gas G from the tank. The nitrogen gas G is an example of an inert gas. Further, the inert gas is not limited thereto, and may be other gases such as helium and argon, for example.

As illustrated in FIG. 3, the gas supply unit 22 supplies the nitrogen gas G to the gaps S from the supply ports 71 through the hoses 64 and the supply passage 77. Through the supply passage 77, the nitrogen gas G is supplied from the supply ports 71 substantially at the same flow rate.

As described above, the supply ports 71 are directed toward the manufacturing region R. For this reason, the nitrogen gas G supplied from the supply ports 71 to the gaps S forms a nitrogen gas atmosphere at least around the manufacturing region R. For example, the nitrogen gas G supplied from the supply ports 71 fills the gaps S.

The fume collection unit 23 of FIG. 1 includes, for example, a pump which suctions gas, and a filter which collects fume F from the gas. Fume F is an example of particles. As described above, the fume collection unit 23 suctions the gas from the treatment chamber 31a through the inlets 43.

As illustrated in FIG. 3, the fume collection unit 23 suctions the nitrogen gas G containing the fume F from the collection ports 72 through the hoses 64 and the collection passage 78. The nitrogen gas G containing the fume F is an example of a gas containing particles. The gas containing particles is not limited thereto, but may be, for example, air containing the fume F.

The flow rate of the nitrogen gas G supplied from the supply ports 71 to the gaps S by the gas supply unit 22 is larger than the flow rate of the nitrogen gas G suctioned from the collection ports 72 by the fume collection unit 23. However, the overall flow rate of the nitrogen gas G supplied by the gas supply unit 22 from the supply ports 71 of the squeegees 51 to the treatment chamber 31a is smaller than the overall flow rate of the nitrogen gas G suctioned from the inlets 43 and the collection ports 72 of the squeegees 51 by the fume collection unit 23. Thus, in the treatment chamber 31a of the treatment tank 31 the air pressure is, for example, lower than the atmospheric pressure. The nitrogen gas G of the gas supply unit 22 may be supplied to the gaps S from the supply port 71 not only by the pump but also by negative pressure in the treatment chamber 31a.

As illustrated in FIG. 1, the control unit 24 is electrically connected to the manufacturing unit 21, the gas supply unit 22, and the fume collection unit 23. The control unit 24 includes various electronic components such as a CPU, a ROM, and a RAM. The control unit 24 controls the manufacturing unit 21, the gas supply unit 22, and the fume collection unit 23 by a program read from the ROM or another storage and executed using the CPU. The manufacturing unit 21 manufactures the object 12 under the control (program) of the control unit 24 as follows, for example.

First, the control unit 24 receives the three-dimensional data of the object 12 from, for example, an external personal computer. The three-dimensional data is, for example, CAD data, but may be other kinds of data.

The control unit 24 generates sectional data sets from the three-dimensional data of the object 12. For example, the control unit 24 divides the three-dimensional shape of the object 12 into two or more layers by a predetermined thickness, and generates slice data of the cross-section of each layer. The slice data may be generated on the external personal computer rather than by the control unit 24, and be input to the control unit 24.

Figure 5:
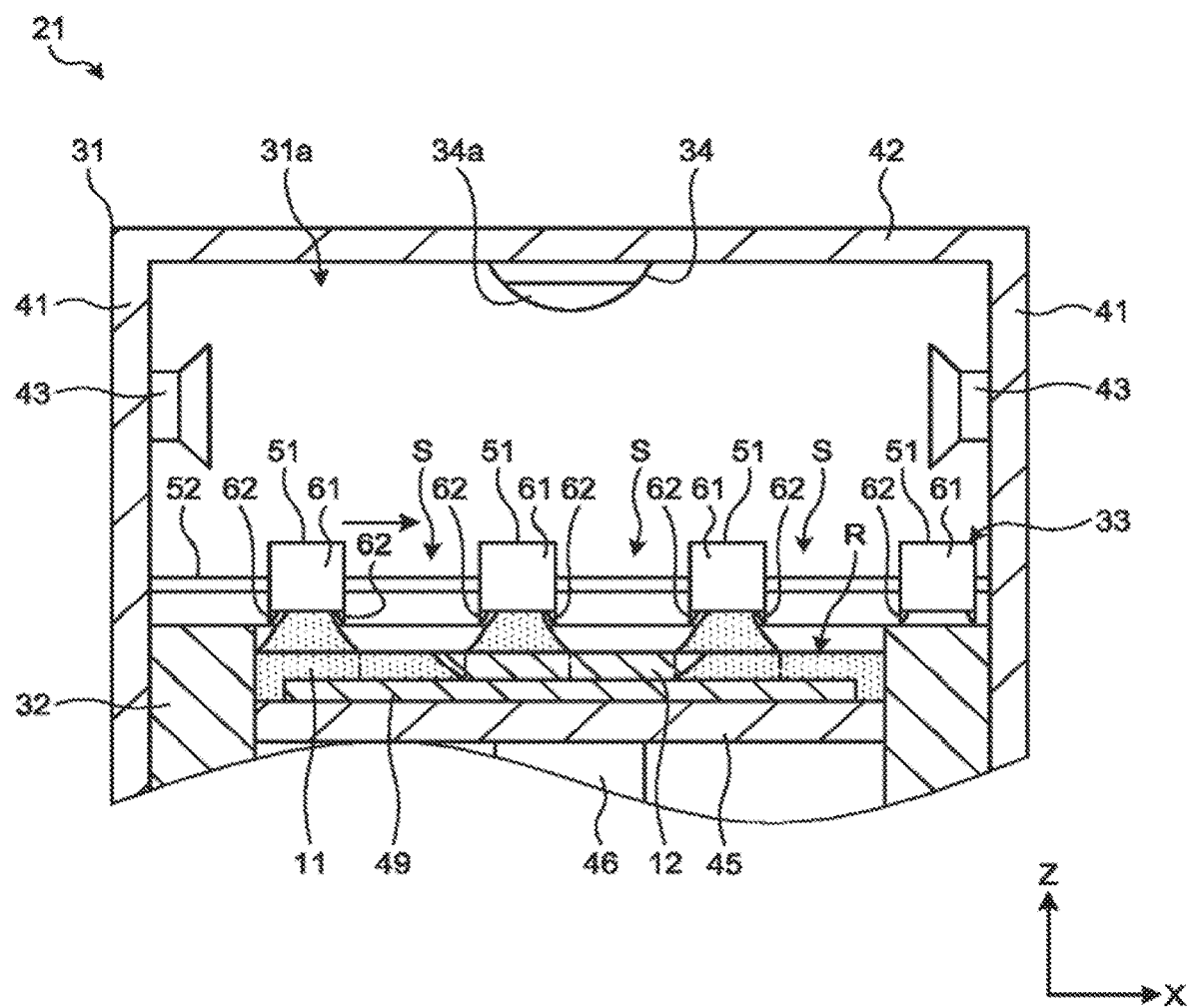
FIG. 5 is a schematic cross-sectional view of a part of a manufacturing unit of the first embodiment to which the material is supplied.

FIG. 5 is a schematic cross-sectional view of a part of the manufacturing unit 21 of the first embodiment to which the material 11 is supplied. The stage 45 of the manufacturing tank 32 descends by one layer as illustrated in FIG. 5. In other words, the manufacturing region R formed of the material 11 descends. Meanwhile, the squeegees 51 remain substantially at the same position in the Z-axis direction.

The material 11 stored in the material storage ports 66 of the squeegee bars 61 is supported by the manufacturing region R. As the manufacturing region R descends, the material 11 is supplied from the material storage ports 66 to the manufacturing region R through the material supply ports 67.

For example, the material supply ports 67 of the squeegee bars 61 supply the material 11 below to a portion of the manufacturing region R. In FIG. 5 the portion of the manufacturing region R below the squeegee bars 61 is sectioned by a chain double-dashed line.

Next, the movers 63 move the squeegee bars 61 in the X-axis direction (rightward in FIG. 5). The squeegees bars 61 are moved substantially at the same speed by the movers 63. This maintains a substantially constant distance (distance of the gap S) between the adjacent squeegee bars 61 in the Z-axis direction. The squeegee bars 61 supply the material 11 from the material supply ports 67 to the manufacturing region R, while being moved.

As the squeegee bars 61 move, the blades 62 level the supplied material 11. In other words, while moved by the movers 63, the squeegees 51 level the supplied material 11 on the manufacturing region R by the blades 62. The blades 62 level the material 11, for example, to substantially the same height as the top end of the manufacturing tank 32.

Figure 6:
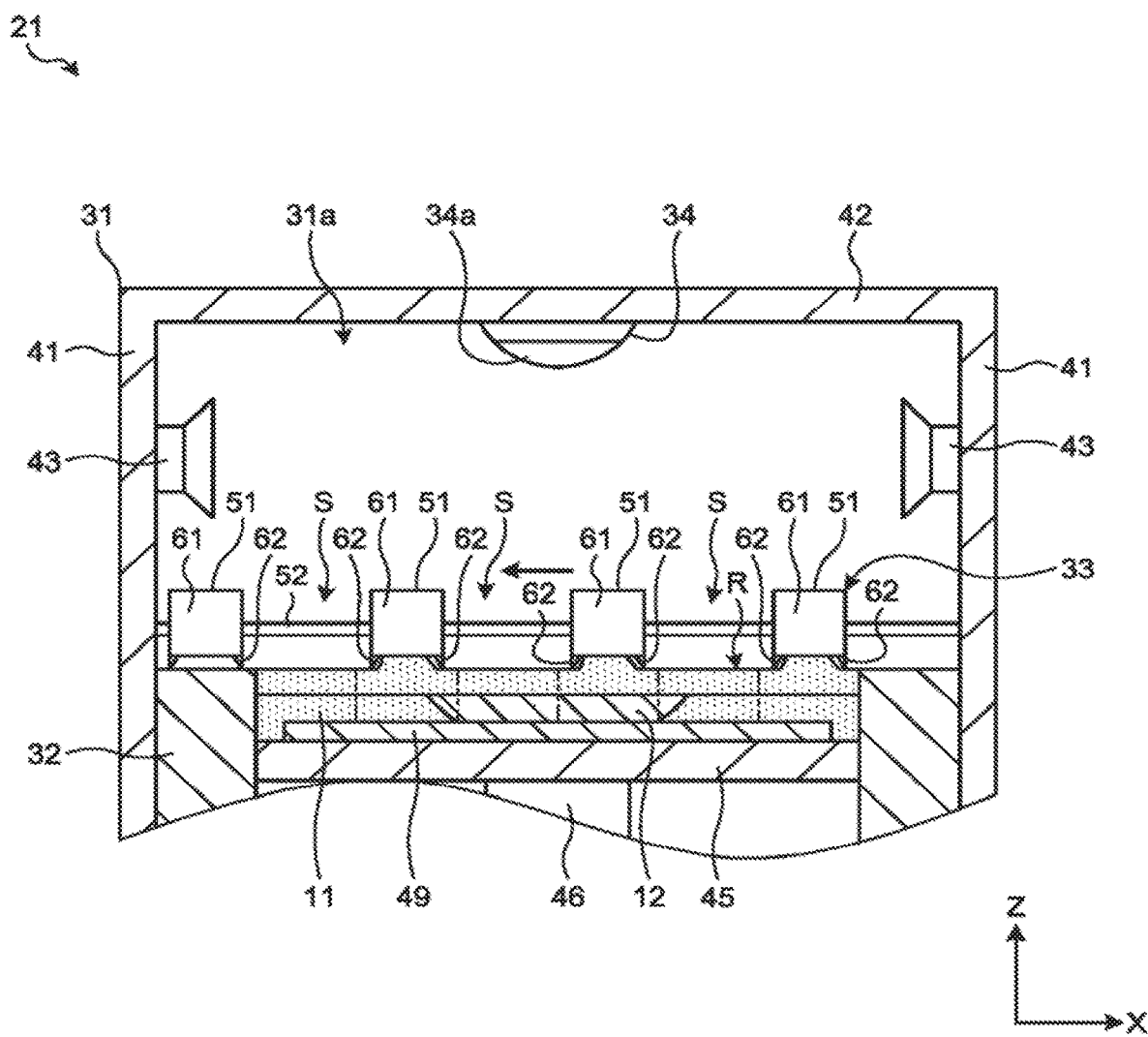
FIG. 6 is a schematic cross-sectional view of a part of a manufacturing unit of the first embodiment in which a material layer is formed.

FIG. 6 is a schematic cross-sectional view of a part of the manufacturing unit 21 of the first embodiment in which the layer of the material 11 is formed. As illustrated in FIG. 6, when the squeegee bars 61 have moved by a predetermined distance, the movers 63 move the squeegee bars 61 in the opposite direction (leftward in FIG. 6).

The squeegee bars 61 supply the material 11 from the material supply ports 67 to the manufacturing region R, and level the material 11 by the blades 62. When the squeegee bars 61 have moved by the predetermined distance, a layer of material 11 is formed on the manufacturing region R. The layer of the material 11 is added on the previously formed manufacturing region R to form a new manufacturing region R. By leveling the material 11 by the blades 62, the manufacturing region R forms substantially the same plane as the op end of the manufacturing tank 32.

Figure 7:
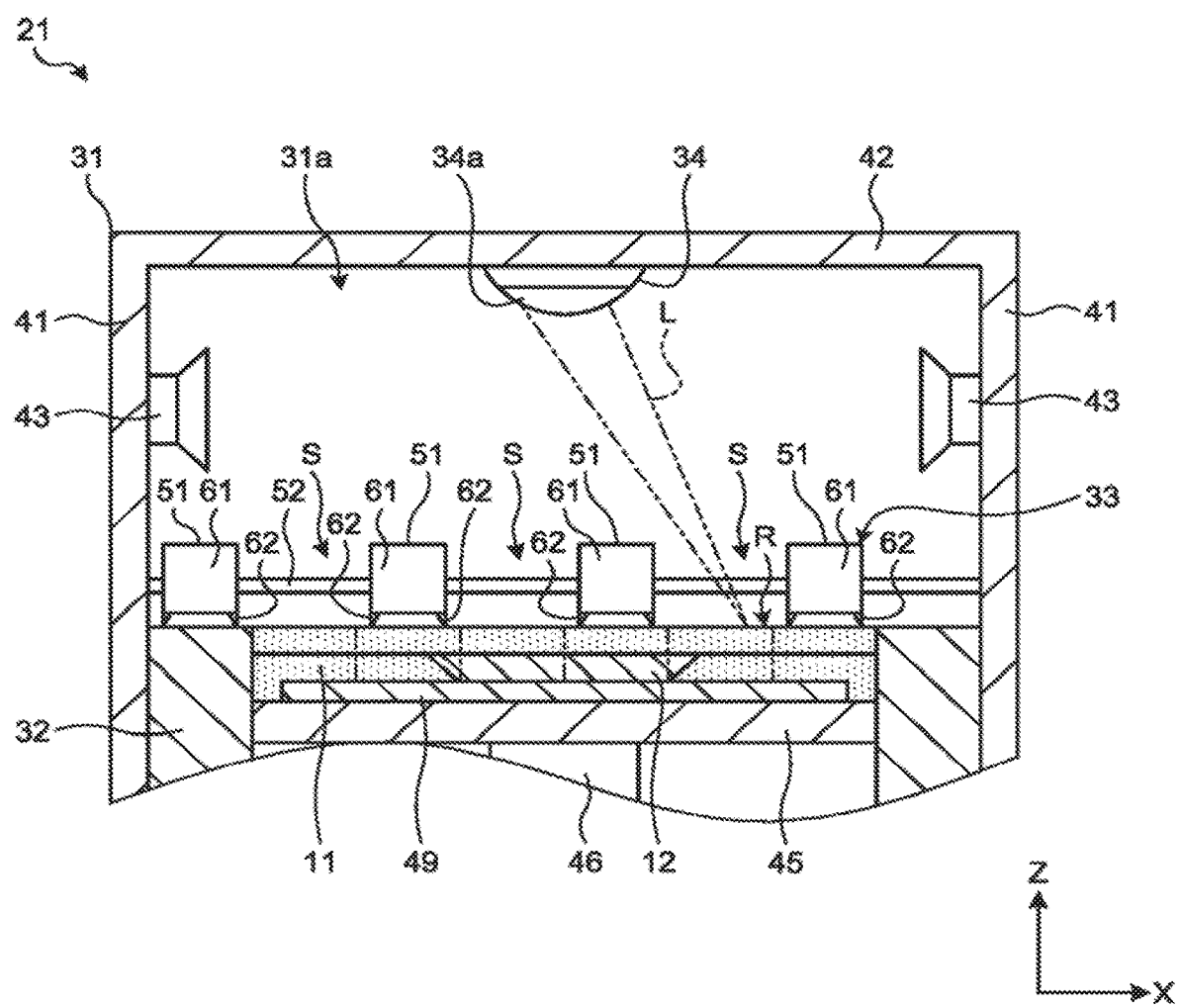
FIG. 7 is a schematic cross-sectional view of a part of a manufacturing unit of the first embodiment in which a manufacturing region is irradiated with a laser beam.

FIG. 7 is a schematic cross-sectional view of a part of the manufacturing unit 21 of the first embodiment in which the manufacturing region R is irradiated with the laser beam L. The control unit 24 controls the optical device 34 to emit the laser beam L to the manufacturing region R from the irradiator 34a. The control unit 24 sets the target position of the laser beam L on the basis of the generated cross-sectional slice data.

The irradiator 34a irradiates the material 11 of the manufacturing region R with the laser beam L through the gaps S. In other words, the irradiator 34a irradiates the portions of the manufacturing region R between the adjacent squeegees 51 with the laser beam 1.

For example, the irradiator 34a continuously emits the laser beam L in the Y-axis direction (main scanning direction) in which the gaps S extend. The irradiator 34a moves the target position of the laser beam L in the X-axis direction (sub scanning direction) at the Y-axial end of the manufacturing region R. The irradiator 34a reverses the moving direction of the position to irradiate with the laser beam L at the Y-axial end of the manufacturing region R.

As illustrated in FIG. 3, the gas supply unit 22 supplies the nitrogen gas G to the gaps S from the supply ports 71 to form a nitrogen, gas atmosphere. A portion 11a of the layer of the material 11, irradiated with the laser beam L in the nitrogen gas atmosphere, is melted. The optical device 34 emits the laser beam L to the material 11 to partially melt it and then solidifies the molten material 11 by natural cooling, for instance. As a result, the layer of the material 11 is formed into a part of the object 12. The material 11 may be sintered.

Figure 8:
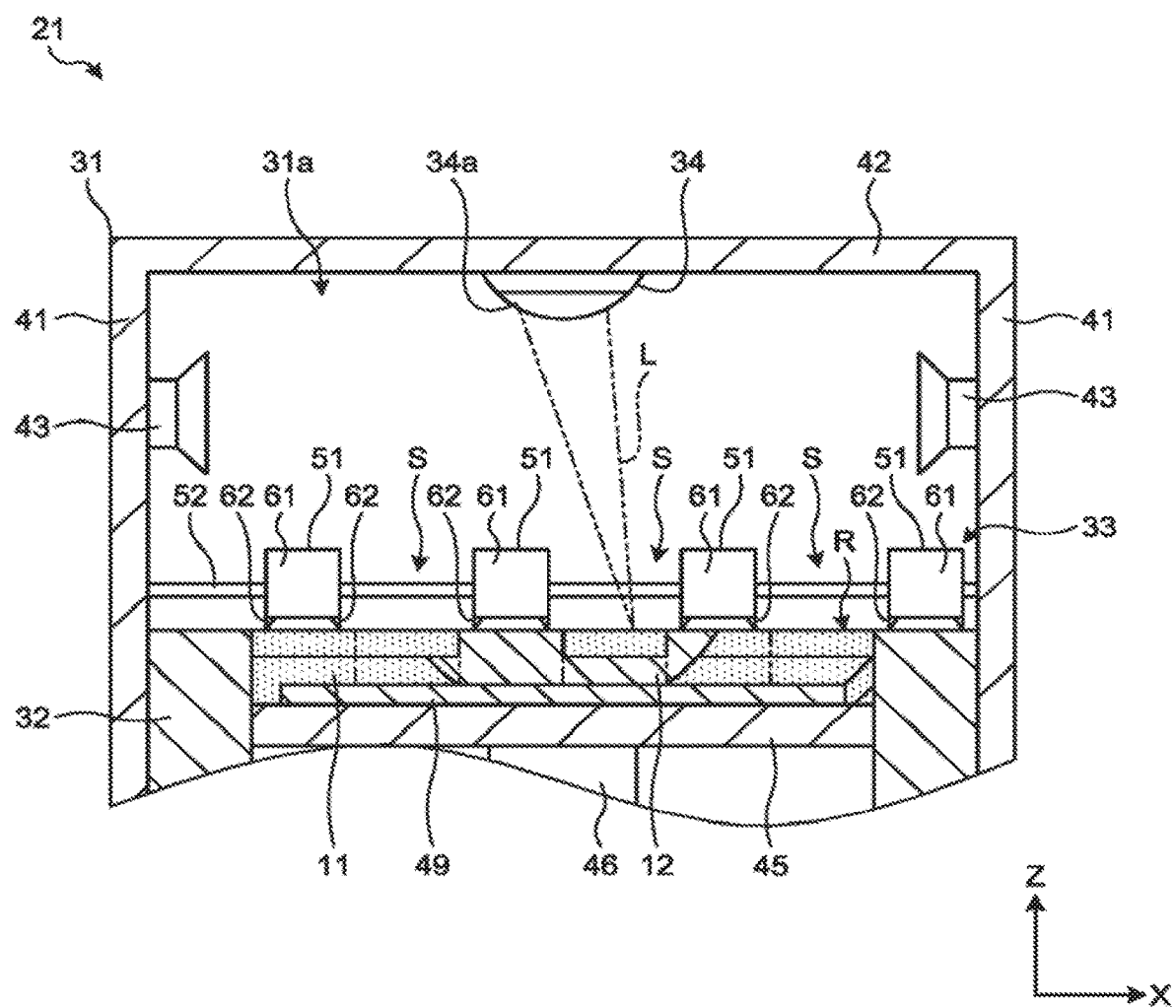
FIG. 8 is a schematic cross-sectional view of a part of a manufacturing unit of the first embodiment in which another part of the manufacturing region is irradiated with a laser beam.

FIG. 8 is a schematic cross-sectional view of a part of the manufacturing unit 21 of the first embodiment in which another part of the manufacturing region R is irradiated with the laser beam L. When the irradiator 34a finishes emitting the laser beam L to the exposed portion of the manufacturing region R in the gap S, the movers 63 move the squeegee 51 in the X-axis direction (rightward in FIG. 8). As a result, the portion of the manufacturing region R covered with the squeegee 51 in the state of FIG. 7 is exposed from the gap S.

The irradiator 34a irradiates the material 11 in the manufacturing region R with the laser beam L through the gap S. As a result, the portion of the manufacturing region R covered with the squeegee 51 in the state of FIG. 7 is melted and solidified.

As illustrated in FIG. 3, the gas supply unit 22 supplies the nitrogen gas G to the gaps S from the supply ports 71 to form a nitrogen gas atmosphere. The portion 11a of the layer of the material 11, irradiated with the laser beam L in the nitrogen gas atmosphere, is melted. The optical device 34 emits the laser beam L to the material 11 to partially melt it and then solidify the molten material 11 by natural cooling, for example. As a result, the layer of the material 11 is formed into one layer of the object 12.

Upon completion of the emission of the laser beam L from the optical device 34 to the material 11, the three-dimensional printer 10 repeats the layer formation and the melting of the material 11, as in the above description. Thereby, the three-dimensional printer 10 additively manufactures the three-dimensional object 12.

The material 11 may evaporate through melting or sintering with the laser beam L. The evaporated material 11 aggregates and forms fume F. At the gaps S, the fume F is mixed with nitrogen gas G, for example. The nitrogen gas G containing the fume F is to move upward at the gaps S. The fume F may be mixed with, for example, the air in the treatment chamber 31a.

The fume collection unit 23 suctions the nitrogen gas G containing the fumes F in or around the gaps S from the collection ports 72 opening to the gaps S. Further, the fume collection unit 23 suctions, from the treatment chamber 31a, the nitrogen gas G containing the fume F, which has flowed out from the gaps S to the treatment chamber 31a, through the inlets 43 of FIG. 1.

As described above, the three-dimensional printer 10 manufactures the object 12 from the material 11. Further, the fume F generated during the manufacturing of the object 12 is collected by the fume collection unit 23.

In the three-dimensional printer 10 according to the first embodiment, the layering device 33 includes the squeegees 51 (51A, 51B) aligned in the X-axis direction, and the gaps S extending in the Z-axis direction is provided between the squeegee 51A and the squeegee 51B. The nitrogen gas G is supplied to the gaps S through the supply ports 71 of the squeegees 51. The movers 63 move the squeegees 51 of the layering device 33 with respect to the manufacturing region R, and the irradiator 34a irradiates the material 11 of the manufacturing region R with the laser beam L through the gaps S between the moving squeegees 51. Thereby, the gas supply unit 22 can fill the gaps S with the nitrogen gas G and inhibit the oxidation of the irradiated portion of the material 11 with the laser beam L. Since the gaps S are filled with the nitrogen gas G, the treatment chamber 31a may not be filled with the nitrogen gas G, and may contain air. This can, for example, eliminate the time for filling the interior of the treatment chamber 31a with the nitrogen gas G, resulting in shortening the manufacturing time of the three-dimensional printer 10 for the object 12. Further this can reduce the amount of the nitrogen gas G used for manufacturing the object 12.

Further, the irradiator 34a is capable of changing the position to irradiate with the laser beam L, and is spaced apart from the layering device 33. That is, the irradiator 34a can change the target position of the laser beam L by changing the emitting direction of the laser beam L, for example, using a galvano scanner. The squeegees 51 of the layering device 33, which are spaced apart with the gaps S and moved, are independent from the irradiator 34a and relatively light. Because of this, as compared with moving the irradiator 34a to move the target position of the laser beam L, the target position of the laser beam L is quickly changed, leading to quickly moving the layering device 33 provided with the gaps S through which the laser beam L passes. This makes it possible to shorten the manufacturing time of the three-dimensional printer 10 for the object 12.

By irradiation with the laser beam L, for example, the fume F as an oxidized material 11 may be generated from the material 11. The fume F is contained in an evaporated material 11, the nitrogen gas G, or a gas such as air, and tends to rise. The fume collection unit 23 suctions a gas (e.g., nitrogen gas G) containing the fume F from the collection ports 72 in the first side face 61a. That is, the nitrogen gas G containing the fume F generated in the gaps S is suctioned from the collection ports 72 facing the gaps S. Thereby, the laser beams L is prevented from being blocked by the nitrogen gas G containing the fume F, and the nitrogen gas G containing the fume F flowing from the gaps S is prevented from contaminating the irradiator 34a. This can reduce removal work of the nitrogen gas G containing the fume F around the manufacturing region R or cleaning work of the irradiator 34a contaminated with the nitrogen gas G containing the fume F, which can shorten the manufacturing time of the three-dimensional printer 10 for the object 12. Further, the collection ports 72 suction the nitrogen gas G containing the fume F in the vicinity of the molten portion 11a of the material 11 generating the fume F, therefore, the fume collection unit 23 can reduce the suctioning force to the nitrogen gas G containing the fume F.

In the Z-axis direction, the collection ports 72 are located farther away from the manufacturing region R than the supply ports 71 are. This makes it possible to ensure that the periphery of the manufacturing region R is filled with the nitrogen gas G supplied from the supply ports 71, and to inhibit the oxidation of the portion 11a of the material 11 irradiated with the laser beam L. Further, the gas containing the relatively light fume F tends to move upward, and the collection ports 72 are disposed at higher position to which the nitrogen gas G containing the fume F moves. Thus, the nitrogen gas G containing the fume F is more efficiently collected.

The supply ports 71 are further directed toward the manufacturing region R than toward the X-axis direction, and the collection ports 72 are directed farther away from the manufacturing region R rather than in the X-axis direction. This prevents the nitrogen gas G supplied from the supply ports 71 from being suctioned from the collection ports 72 before filling the periphery of the manufacturing region R.

The treatment tank 31 accommodating the layering device 33, the movers 63, and the irradiator 34a is provided with the inlets 43. The fume collection unit 23 suctions the nitrogen gas G containing the fume F from the inlets 43 of the treatment tank 31. As a result, the nitrogen gas G containing the fume F not suctioned from the collection ports 72 is suctioned into the fume collection unit 23 from the inlets 43. Thus, the nitrogen gas G containing the fume F is more certainly recovered.

The squeegees 51 of the layer device 33 are each provided with the material storage port 66 in which the material 11 is stored, and the material supply port 67 from which the material 11 is supplied to the manufacturing region R. Such squeegees 51 are moved by the movers 63 to supply the material 11 from the material supply ports 67 to the manufacturing region R. This enables the supply of the material 11 to the manufacturing region R without retracting the squeegees 51 covering a part of the manufacturing region R, thereby shortening the manufacturing time of the three-dimensional printer 10 for the object 12.

The blades 62 of the layer device 33 can level the supplied material 11 supplied to the manufacturing region R, while moved by the movers 63. As a result, the material 11 in the manufacturing region R can be leveled without retracting the squeegees 51 covering a part of the manufacturing region R, thereby shortening the manufacturing time of the three-dimensional printer 10 for the object 12.

The gas supply unit 22 supplies the nitrogen gas G to the gaps S not only from the supply ports 71 in the first side face 61a but also from the supply ports 71 in the second side face 61b. Thus, the nitrogen gas G is supplied to the gaps S from the supply ports 71 in the opposing first and second side faces 61a and 61b, more surely filling the gaps S with the nitrogen gas G, and inhibiting the oxidation of the irradiated portion 11a of the material 11 with the laser beam L.

The squeegees 51 are provided with the supply passages 77 that connect the gas supply unit 22 and the supply ports 71. The supply passages 77 each include the furcations 77a and 77b which divide the routes from the gas supply unit 22 to the supply ports 71. The numbers of the furcations 77a and 77b in the respective routes are the same, the lengths of the furcations 77a and 77b at the same stage are the same, and the lengths of the respective routes are the same. Because of this, the nitrogen gas G is uniformly supplied to the gaps S from the supply ports 71, preventing the occurrence of imbalance in the distribution of the nitrogen gas G in the gaps S.

The squeegees 51 extend in the Y-axis direction. The movers 63 move the squeegees 51 in the X-axis direction intersecting with the Y-axis direction. Thus, the movers 63 move the squeegees 51 in one direction, which can decrease the moving distance of the squeegees 51, and shorten the manufacturing time of the three-dimensional printer 10 for the object 12.

Considering the adjacent squeegees 51 as the squeegee 51A and the squeegee 51B, the layering device 33 includes multiple squeegees 51A and multiple squeegees 51B aligned alternately in the X-axis direction. With such squeegees 51A and 51B provided, thus, the moving distance of the layering device 33 can be shortened, shortening the manufacturing time of the three-dimensional printer 10 for the object 12.

Hereinafter, a second embodiment will be described with reference to FIGS. 9 and 10. In the embodiments below, constituent elements having the same functions as the above-described constituent elements are denoted by the same reference numerals, and the explanation thereof may be omitted. However, constituent elements denoted by the same reference numerals do not necessarily have all the same functions and properties, and may have different functions and properties according to the respective embodiments.

Figure 9:
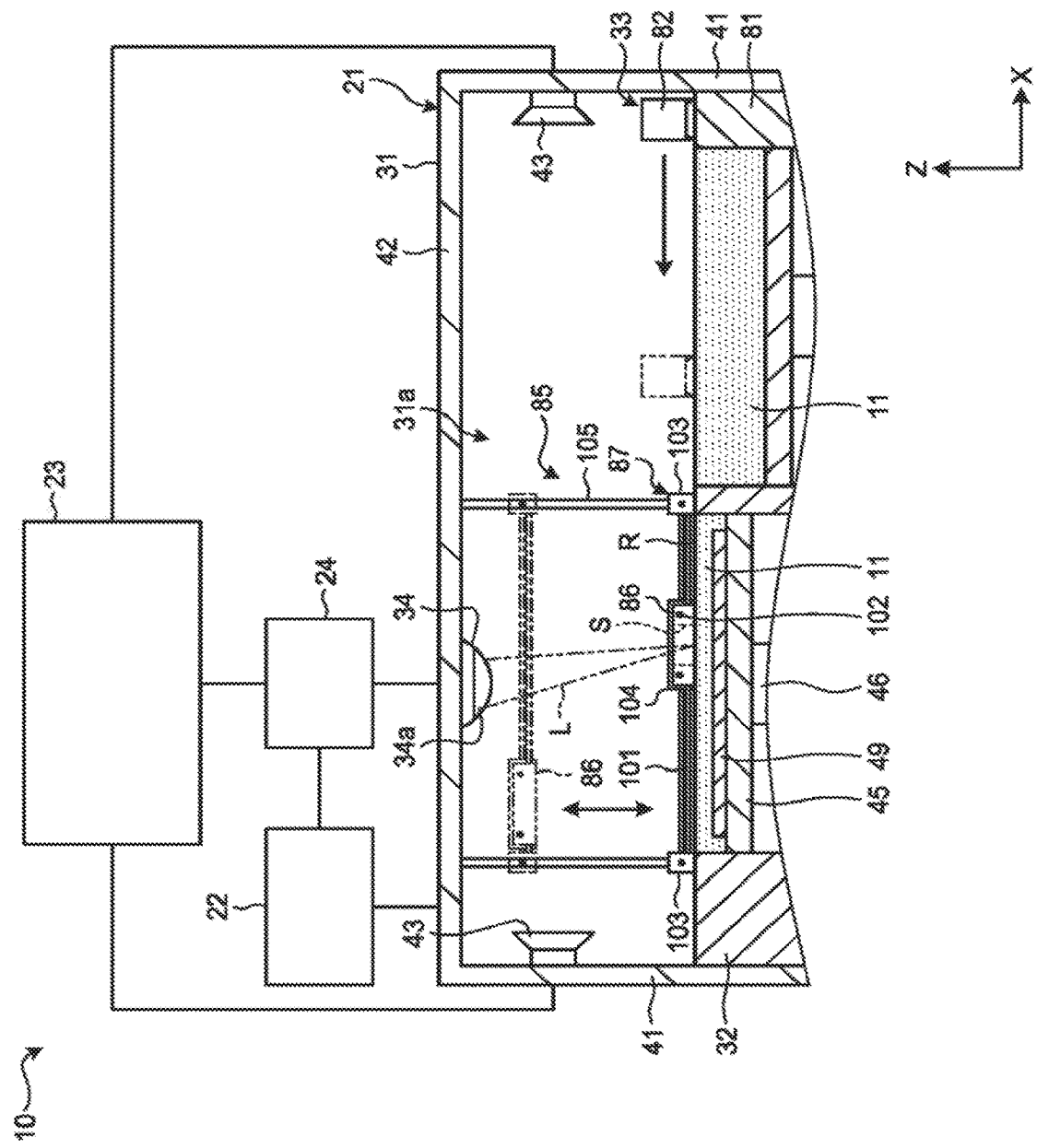
FIG. 9 is a schematic cross-sectional view of a three-dimensional printer according to a second embodiment.

FIG. 9 is a schematic cross-sectional view of a three-dimensional printer 10 according to a second embodiment. As illustrated in FIG. 9, a layer device 33 of the second embodiment includes a material tank 81 and a squeegee 82, in place of the squeegees 51 and the rail 52.

The material tank 81 is provided adjacent to the manufacturing tank 32 in the X-axis direction. For example, when the stage 45 of the manufacturing tank 32 descends by one layer, the material 11 ascends in the material tank 81, and the material 11 of one layer appears from the material tank 81.

The squeegee 82 is moved between the top of the material tank 81 and the top of the manufacturing tank 32 in the X-axis direction. The squeegee 82 presses the material 11 on the material tank 81 toward the manufacturing tank 32 for supply. Thus, a layer of the material 11 is formed in the manufacturing tank 32.

The manufacturing unit 21 of the second embodiment further includes a protective device 85. The protective device 85 includes a moving element 86 and a moving device 87. The moving element 86 is an example of an operation unit. The moving device 87 is an example of a mover.

Figure 10:
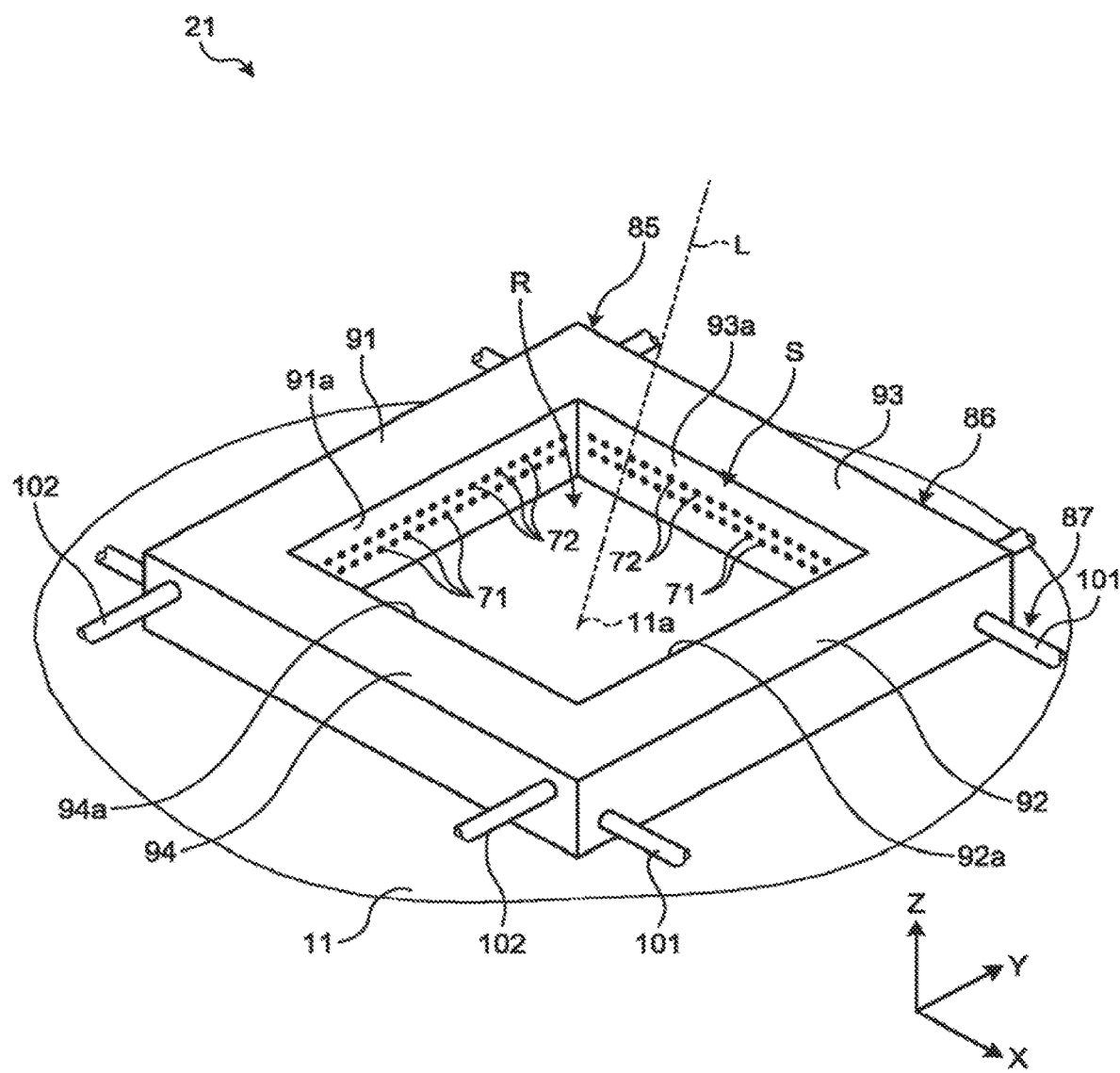
FIG. 10 is a perspective view of a part of a protective device of the second embodiment.

FIG. 10 is a perspective view of a part of the protective device 85 of the second embodiment. As illustrated in FIG. 10, the moving element 86 has a substantially rectangular frame shape. In other words, the moving element 86 has a substantially quadrangular tubular shape extending in the Z-axis direction. The moving element 86 includes a first part 91, a second part 92, a third part 93, and a fourth part 94.

The first part 91 and the second part 92 extend in the Y-axis direction. The first part 91 and the second part 92 are aligned in the X-axis direction with a gap S. As in the first embodiment, the gap S extends in the Z-axis direction.

The first part 91 has a first inner face 91a. The second part 92 has a second inner face 92a. The first inner face 91a and the second inner face 92a are directed in the X-axis direction, and are opposite to each other.

The third part 93 and the fourth part 94 extend in the X-axis direction. The third part 93 and the fourth part 94 are aligned in the Y-axis direction with a gap S. The third part 93 connects one end of the first part 91 and one end of the second part 92. The fourth part 94 connects the other end of the first part 91 and the other end of the second part 92.

The third part 93 has a third inner face 93a. The fourth part 94 has a fourth inner face 94a. The third inner face 93a and the fourth inner face 94a are directed in the Y-axis direction, and are opposite to each other.

The first to fourth inner faces 91a to 94a are each provided with supply ports 71 and collection ports 72. In other words, the supply ports 71 and the collection ports 72 face the gap S inside the first to fourth parts 91 to 94.

Each of the first to fourth parts 91 to 94 includes a supply passage 77 that connects the gas supply unit 22 and the supply ports 71, and a collection passage 78 that connects the fume collection unit 23 and the collection ports 72. As in the first embodiment, the supply passage 77 is connected to the gas supply unit 22 via hoses 64. As in the first embodiment, the collection passage 78 is connected to the fume collection unit 23 via hoses 64.

The moving device 87 includes two first rails 101, two second rails 102, two first sliders 103, two second sliders 104, and an elevating mechanism 105 illustrated in FIG. 9. FIG. 9 illustrates one of the two second sliders 104.

Each of the two first rails 101 extends in the X-axis direction. The first rails 101 insert through a hole of the moving element 86 to movably support the moving element 86 in the X-axis direction.

Each of the two second rails 102 extends in the Y-axis direction. The second rails 102 insert through a hole of the moving element 86 to movably support the moving element 86 in the Y-axis direction.

As illustrated in FIG. 9, the two first sliders 103 are connected to both ends of the first rails 101, respectively. The first sliders 103 move in the Y-axis direction to move the moving element 86 on the first rails 101 in the Y-axis direction.

The two second sliders 104 are connected to both ends of the second rails 102, respectively. The second sliders 104 move in the X-axis direction to move the moving element 86 on the second rails 102 in the X-axis direction.

The moving element 86 is supported by the first and second rails 101 and 102 at a position slightly away from the manufacturing region R in the Z-axis direction. The moving element 86 is movably disposed above the manufacturing region R by the first and second sliders 103 and 104. Thus, the moving element 86 covers a part of the manufacturing region R. Further, a part of the manufacturing region R is exposed from the gap S inside the moving element 86, for example, when viewed from the top wall 42.

The elevating mechanism 105 moves the first rails 101, the second rails 102, the first sliders 103, and the second sliders 104 in the Z-axis direction. That is, the elevating mechanism 105 moves the moving element 86 on the first and second rails 101 and 102 in the Z-axis direction.

The manufacturing unit 21 of the second embodiment manufactures the object 12 under the control (program) of the control unit 24, for example, as follows. First, the control unit 24 receives the three-dimensional data of the object 12, for example, from an external personal computer. The control unit 24 generates slice data of cross sections from the three-dimensional data of the object 12. The slice data may be generated on the external personal computer rather than by the control unit 24, and be input to the control unit 24.

Next, the elevating mechanism 105 moves the moving element 86 in the Z-axis direction (upward in FIG. 9). In the Z-axis direction, the distance between the moving element 86 moved by the elevating mechanism 105 and the manufacturing region R is longer than the height of the squeegee 82.

Next, the stage 45 of the manufacturing tank 32 is lowered by one layer, and the material tank 81 raises the material 11 by one layer. The squeegee 82 presses the material 11 on the material tank 81 toward the manufacturing tank 32 to supply the material 11 to the manufacturing region R. Thus, a layer of the material 11 is formed n the manufacturing tank 32 to form a new manufacturing region R.

Next, the elevating mechanism 105 moves the moving element 86 in the Z-axis direction (downward in FIG. 9). The moving element 86 is disposed slightly away from the manufacturing region R in the Z-axis direction.

The control unit 24 controls the optical device 34 to emit the laser beam L to the manufacturing region R from the irradiator 34a. The irradiator 34a irradiates the material 11 of the manufacturing region R with the laser beam L through the gap S. In other words, the irradiator 34a irradiates the portion of the manufacturing region R between the first part 91 and the second part 92 with the laser beam L.

The irradiator 34a continuously moves the target position of the laser beam L. The irradiator 34a moves the target position of the laser beam L, and the moving device 87 moves the moving element 86. The moving element 86 is moved by the moving device 87 so that the gap S follows the target position of the laser beam L from the irradiator 34a.

The gas supply unit 22 supplies the nitrogen gas G to the gap S from the supply ports 71 to form a nitrogen gas atmosphere. The portion 11a of the layer of the material 11, irradiated with the laser beam L in the nitrogen gas atmosphere, is melted. The optical device 34 emits the laser beam L to the material 11 to partially melt it and then solidify the molten material 11 by natural cooling, for instance. As a result, the layer of the material 11 is formed into a layer of the object 12. The material 11 may be sintered.

The fume collection unit 23 suctions the nitrogen gas G containing the fumes F in or around the gap S from the collection ports 72 opening to the gap S. Further, the fume collection unit 23 suctions the nitrogen gas G containing the fume F, which has flowed from the gap S to the treatment chamber 31a, from the inlets 43.

When the optical device 34 finishes emitting the laser beam L to the material 11, the three-dimensional printer 10 repeats the layer formation and the melting of the material 11, as described above. Thereby, the three-dimensional printer 10 additively manufactures the three-dimensional object 12.

As described above, the three-dimensional printer 10 manufactures the object 12 from the material 11. Further, the fume F generated during manufacturing of the object 12 is collected by the fume collection unit 23.

In the three-dimensional printer 10 of the second embodiment, the moving element 86, which supplies the nitrogen gas G from the supply ports 71 and suctions the nitrogen gas G containing the fume F from the collection ports 72, is provided independently from the protective device 85 which supplies the material 11. This can reduce the moving element 86 in weight, which makes it possible to quickly change the target position of the laser beam L, and to quickly move the layering device 33 provided with the gap S through which the laser beam L passes. Thus, it is possible to shorten the manufacturing time of the three-dimensional printer 10 for the object 12.

According to at least one of the embodiments described above, the irradiator is spaced away from the operation unit, to be able to emit energy rays to the material in the supply region through the first opening of the operation unit, and change the target position of the energy rays. This makes it possible to shorten the three-dimensional manufacturing time of the additive manufacturing apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes described herein may be made without departing from the spirit of the inventions. The accompanying claims and their equivalents are intended to cover such forms or modifications as would fall within the scope and spirit of the inventions.

The invention claimed is:

1. An additive manufacturing apparatus comprising:
an operation unit which includes a first part and a second part and is provided with a first opening between the first part and the second part, the first part and the second part that cover a part of a supply region facing a first direction and supplied with a powdery material, and that are aligned in a second direction intersecting with the first direction, the first opening extending in the first direction;
a first face of the first part facing the second part, and provided with a second opening;
a mover which moves the operation unit with respect to the supply region;
a supplier which supplies an inert gas from the second opening to the first opening; and
an irradiator which is spaced apart from the operation unit, and is capable of emitting an energy ray to the material in the supply region through the first opening, and changing a position with which the energy ray is irradiated.

2. The additive manufacturing apparatus according to claim 1, further comprising
a suction unit,
wherein the first face is provided with a third opening, and the suction unit suctions gas containing particles from the third opening.

3. The additive manufacturing apparatus according to claim 2, wherein, in the first direction, the third opening is disposed farther away from the supply region than the second opening is.

4. The additive manufacturing apparatus according to claim 3, wherein the second opening is further directed toward the supply region than toward the second direction, and
the third opening is directed farther away from the supply region rather than in the second direction.

5. The additive manufacturing apparatus according to claim 2, further comprising:
a treatment tank which accommodates at least a part of the operation unit, at least a part of the mover, and at least a part of the irradiator, and is provided with an inlet, wherein the suction unit suctions the gas containing particles from the inlet.

6. The additive manufacturing apparatus according to claim 1, wherein the operation unit include a storage in which the material is stored, and a material supplier which supplies the material from the storage to the supply region.

7. The additive manufacturing apparatus according to claim 1, wherein the operation unit is capable of leveling the supplied material in the supply region, while being moved by the mover.

8. The additive manufacturing apparatus according to claim further comprising:
a second face of the second part, facing the first part, and provided with a fourth opening,
wherein the supplier supplies an inert gas from the fourth opening to the first opening.

9. The additive manufacturing apparatus according to claim 1, wherein the second opening includes outlets provided in the first face,
the first part includes a branch passage that connects the supplier and the outlets, and
the branch passage includes furcations that divide routes from the supplier to the outlets,
numbers of the furcations in the routes are the same,
lengths of the furcations in a same stage are the same, and
lengths of the routes are the same.

10. The additive manufacturing apparatus according to claim 1, wherein the first part and the second part extend in a third direction which intersects with the first direction and the second direction, and
the mover moves the operation unit in the second direction.

11. The additive manufacturing apparatus according to claim 10, wherein the operation unit includes plural first parts and plural second parts, the first and second parts being alternately aligned in the second direction with a first opening provided between each of the parts.

* * * * *